US005657009A

United States Patent [19]
Gordon

[11] Patent Number: 5,657,009
[45] Date of Patent: Aug. 12, 1997

[54] SYSTEM FOR DETECTING AND VIEWING AIRCRAFT-HAZARDOUS INCIDENTS THAT MAY BE ENCOUNTERED BY AIRCRAFT LANDING OR TAKING-OFF

[76] Inventor: Andrew A. Gordon, 5193 Woodley Ave., Encino, Calif. 91436

[21] Appl. No.: 500,098

[22] Filed: Jul. 10, 1995

Related U.S. Application Data

[63] Continuation-in-part of Ser. No. 287,808, Aug. 9, 1994, abandoned, which is a continuation-in-part of Ser. No. 976,571, Nov. 16, 1992, abandoned, which is a continuation-in-part of Ser. No. 785,783, Oct. 31, 1991, abandoned.

[51] Int. Cl.$^6$ .................................................. G08B 23/00
[52] U.S. Cl. ........................... 340/968; 340/971; 340/972; 342/26; 364/424.06
[58] Field of Search ..................................... 340/968, 971, 340/995, 988, 972, 980, 973, 961, 949; 342/26, 33; 364/439, 424.06, 449, 460, 434; 73/170.01, 170.11

[56] References Cited

U.S. PATENT DOCUMENTS

| | | | |
|---|---|---|---|
| 4,994,974 | 2/1991 | Cummings | 364/443 |
| 5,111,400 | 5/1992 | Yoder | 364/439 |
| 5,227,786 | 7/1993 | Hancock | 340/961 |
| 5,257,021 | 10/1993 | Comman | 340/968 |
| 5,262,773 | 11/1993 | Gordon | 340/968 |
| 5,351,045 | 9/1994 | Comman | 340/968 |

*Primary Examiner*—Brent A. Swarthout
*Attorney, Agent, or Firm*—Albert O. Cota

[57] ABSTRACT

A system and method for detecting and viewing aircraft hazardous incidents such as flying aircraft and meteorological phenomena which includes microbursts, thunderstorms, tornadoes, and the wake turbulence of aircraft. The aircraft hazardous incidents are positionally and horizontally displayed to the pilot on a display, that is located in the aircraft cockpit, in relation to the flight path of the aircraft. The timely displaying of any of the aircraft hazardous incidents permits the pilot to take evasive action to avoid a potentially dangerous incident.

17 Claims, 2 Drawing Sheets

SYSTEM FOR DETECTING AND VIEWING AIRCRAFT-HAZARDOUS INCIDENTS THAT MAY BE ENCOUNTERED BY AIRCRAFT LANDING OR TAKING-OFF

REFERENCE TO PRIOR APPLICATIONS

This application is a continuation-in-part of application Ser. No. 08/287,808 filed Aug. 9, 1994, now abandoned, which is a continuation-in-part of a U.S. patent application Ser. No. 07/976,571, filed Nov. 16, 1992, now abandoned, which is also a continuation-in-part of Ser. No. 07/785,783 filed Oct. 31, 1991, now abandoned.

TECHNICAL FIELD

The invention pertains to the general field of on-board aircraft navigation and weather display systems and more particularly to a system which directly displays meteorological phenomena such as microbursts and other flying aircraft in relation to the flight path of the aircraft to allow a pilot to take evasive action.

BACKGROUND ART

Aircraft-hazardous incidents that are encountered by landing aircraft consist of meteorological phenomena and aircraft flying in close proximity to the runway. The meterological phenomena includes microbursts, thunderstorms, tornadoes and the wake turbulence of aircraft.

Microbursts, which are also known as windshear, have always been a serious hazard to aviation. The microburst is defined as a powerful downward blast of wind usually associated with a thunderstorm or rain, followed by a violent vertical burst of wind and after touchdown, disperses in all directions, hence windshear. Microbursts typically have diameters of a half mile or less and are short-lived, with ninety percent of the microburst reaching maximum velocity in ten minutes. A region of superheated air some distance above the ground is initially penetrated by rain. The rain evaporates at a high rate to quickly reduce the air temperature and thereby increase the density of the superheated air. The now heavy air proceeds to move downwardly in an accelerating rate until it reaches ground level where it must now spread horizontally. The short-term nature of the microburst occurs because the rapid air fall causes a partial vacuum and thus, as the air drops to the ground and is heated, it returns to reduce that partial vacuum. As additional rain penetrates the region, equilibrium results and the microburst terminates. Wind has been found to gust down vertically at least four thousand feet per minute from distances of two thousand feet from ground level. The basic shape of the microburst, if it could be seen would be like that of an inverted mushroom.

An aircraft flying through a microburst first encounters a headwind that provides good lift. This headwind may be up to fifty miles an hour. Then the aircraft, in a very short space of time and distance, encounters the opposite wind which now becomes a tailwind again at fifty miles an hour in the opposite direction. Thus, the aircraft has now experienced one hundred miles an hour air speed change over distances as short as one mile. If an aircraft is flying flaps down and near landing speed and encounters a tail wind, the pilot experiences a sudden loss of air speed. If adjustments can not be made quickly, or if the plane is so heavily loaded or dragging that it cannot make rapid accommodating changes, the aircraft may crash.

Explained a little differently, an aircraft during takeoff and landing is typically operated near stall speed and the acceleration capabilities on large aircraft are inadequate to cope with large air speed variations. The first symptom of a microburst is a relatively rapid increase in the headwind. This increases the air flow across the wings and if nothing else is changed, the performance of the aircraft will cause it to rise above the desired flight path. The typical pilot would choose to throttle back to reduce power to a safe air speed. Almost immediately a downdraft occurs and the headwind disappears and a strong tailwind becomes prevalent. Because the pilot is now in a powered-down mode, increased air speed to counteract the tailwind is now required. However, the aircraft does not have the acceleration capabilities to cope with this rapid variation and the aircraft stalls and a subsequent crash is quite frequently a common occurrence.

It is important to remember that the only time a microburst becomes a serious hazard is when it appears in close proximity to an airport runway to thereby cause the aircraft to rapidly change altitude in areas where any significant change in altitude is disastrous, once a microburst is detected, the pilot can be warned and could maneuver the aircraft either around the microburst or if knowing what is to occur, the pilot could possibly maneuver the aircraft safely through the microburst.

A search of the prior art did not disclose any patents that read directly on the claims of the instant invention, however the following U.S. patents are considered related:

| U.S. PAT. No. | INVENTOR | ISSUED |
| --- | --- | --- |
| 5,262,773 | Gordon | 16 November 1993 |
| 5,257,021 | Cornman | 26 October 1993 |
| 5,111,400 | Yoder | 5 May 1992 |
| 5,105,191 | Keedy | 14 April 1992 |
| 4,994,974 | Cummings | 19 February 1991 |

Andrew Gordon, the applicant of the present invention is also the inventor of U.S. Pat. No. 5,262,773 which is hereby incorporated by reference. The U.S. Pat. No. 5,262,773 patent discloses an invention which displays a discovered microburst on a ground flight controller's monitoring screen in relation to the airport runway and in relation to any aircraft that may be using that runway for take-off or landing. The microburst information is then transmitted by the ground flight controller to the pilot of the aircraft to take appropriate evasive action. However, the disadvantage of this system is that the pilot does not observe the microburst directly and must rely on the information being supplied by the air traffic controller (ATC). The present invention overcomes this disadvantage by displaying within the cockpit of the aircraft the appropriate desirable information of the microburst and other meteorological conditions. Thus, the pilot, himself or herself, can take appropriate evasive action without depending upon the secondary information provided by the ATC.

The U.S. Pat. No. 5,257,021 Cornman patent discloses a low-level wind-shear alert system. The system identifies the presence and locus of the wind shear in a predefined area by mapping the two-dimensional wind velocity, measured at a number of locations, to a geographical indication of the wind shear. The system also integrates data and processed information received from sources such as anemometers and doppler radar, to produce the wind shear alerts.

The U.S. Pat. No. 5,111,400 Yoder patent discloses an integrated real-time aircraft flight-crew information dissemination system. The information includes air traffic and meteorological conditions and stores data concerning terrain and moving map features within the range of an air traffic control facility (ATC). An airborne computer and display for generating a continuously updated graphic display of the dynamic and static conditions. The airborne computer also detects potential collisions with the dynamic or static features and issues a warning based on the level of the collision threat. When a potential collision is detected, the aircraft display isolates the threatening target and provides information to facilitate collision avoidance actions.

The U.S. Pat. No. 5,105,191 Keedy patent discloses an apparatus and a method for detecting and indicating weather conditions for aircraft. The apparatus includes a sensor for detecting the weather parameters of air temperature differential and a computer for comparing the parameter value with a stored constant valve. When the parameter valve exceeds the constant valve, a severe weather condition warning indication in the form of a visual and/or audio signal is generated by the computer.

U.S. Pat. No. 4,994,974 Cummings patent discloses a touch-sensitive navigation system. The system permits the pilot of an aircraft to display on a screen a navigation chart showing the position of the aircraft with respect to fixed environmental checkpoints. The system is also designed to allow the system memory to be quickly updated and is intended to supersede navigation chart manuals.

In summary, none of the other disclosed inventions provide the pilot with real live images of wind in real time which are displayed horizontally, so that the pilot can take immediate evasive action.

DISCLOSURE OF THE INVENTION

The present invention is directed to a system for detecting and viewing aircraft-hazardous incidents on a display such as a cathode ray tube (CRT) or a headup display (HUD) located within the cockpit of an aircraft. In its most basic form, the system is comprised of:

A. a ground based system having means for detecting the aircraft-hazardous incidents that occur at close proximity to an airport runway. The ground based system has further means for transmitting signals corresponding to the aircraft-hazardous incidents to an aircraft approaching or taking-off from the runway; and B. an aircraft based system having means for receiving the signals corresponding to the aircraft-hazardous incidents and processing the signals for further application to the display. The display displays the aircraft-hazardous incidents to the pilot of the approaching or taking-off aircraft so that evasive action can be taken by the pilot to avoid a potentially dangerous incident.

The aircraft-hazardous incidents consist of meteorological phenomena and aircraft flying near the runway of an aircraft. The meteorological phenomena further includes microbursts, also known as windshear, thunderstorms, tornadoes, and the wake turbulence of aircraft.

The meteorological phenomena is detected by the ground based system, which then produces output signals which are transmitted to the aircraft based system. The aircraft based system includes an aircraft processor that receives the signals transmitted by the ground based system and processes the information so that it can be displayed in graphic form on the display. The aircraft processor is also designed to receive additional information as to the position, speed, altitude, and the attitude of the approaching aircraft which is taken into consideration in the forming of the image on the display. When the aircraft is in close proximity to the airport, the pilot initiates final approach and landing procedures by decreasing the speed, lowering the landing gear, and in anticipation of landing on a selected runway activates the flaps. During this approach, the displayed image includes a representation of the selected landing runway, and if present, a representation the microburst, the wake turbulence of other aircraft that may be located near or in the flight path of the aircraft, and the location of other aircraft flying within at least a thirty-two nautical mile radius as measured from the ground based system.

The primary object of the invention is to provide a means for pilots of aircraft to directly ascertain the position of a microburst, thunderstorm, tornado, a wake turbulence, and other flying aircraft near the flight path of an aircraft that is attempting to land or take-off from the landing runway of an airport. Thus allowing the pilot to take evasive action to avoid a potentially dangerous incident.

Another object of the invention is to display the location and movements of the microburst to the pilot in conjunction with the aircraft attitude indicator. Thus, not requiring the pilot to observe another instrument over and above the already multiple number of instruments that the pilot is required to observe.

Another object of the present invention is to combine a substantial amount of information on a single display that was previously available only on multiple displays. Thus, eliminating the pilot's existing need to scan several instruments in order to obtain the same information.

Another object of the present invention is to allow a pilot to land the aircraft more rapidly with safety, thereby avoiding abort landing attempts and circling the airport prior to landing. Also, the invention permits aircraft to take-off and land more rapidly with safety thereby, conserving fuel. It has been calculated that, because aircraft can land and take-off quicker, that thousands of tons of fuel will be saved every year in the United States alone.

Another object of the present invention is to provide the pilot with a display that presents a visual presentation that is equivalent to the "real" world environment that could only be observed by the pilot if the pilot were flying under visual flight rules.

During a normally unobscured landing, the pilot is able to observe the runway plus runway markings, the associated landing lights, and a pair of VASI of PAPI lights. The VASI or PAPI lights indicate to the pilot whether the aircraft is too high or too low so that the pilot can adjust to the glide slope accordingly. When flying in bad weather and the runway is obscured, the pilot is not able to use the VASI or PAPI lights and must land strictly by instrumentation. Utilizing the method and structure of the present invention, the pilot is able to observe the runway plus runway markings and the VASI or PAPI lights on the display regardless of weather conditions.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figures 1, 2:
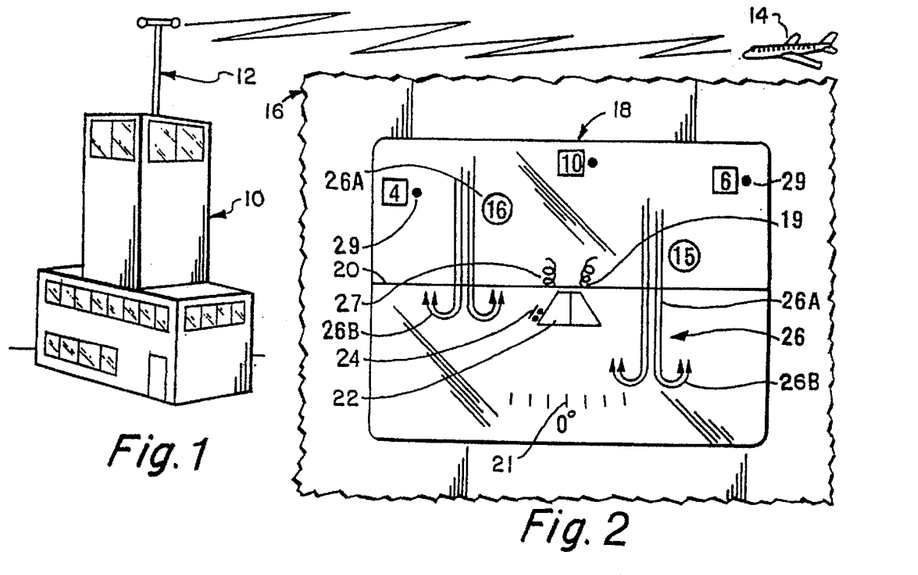
FIG. 1 is a perspective view that generally depicts the overall system of the present invention between the control tower of an airport and a landing aircraft.
FIG. 2 is an elevational view of the display located within the aircraft cockpit that depicts the airport runway, the VASI lights and information pertaining to meteorological phenomena, such as microbursts, aircraft wake turbulence and the location of aircraft flying within at least a thirty-two nautical mile diameter.
Figure 3:
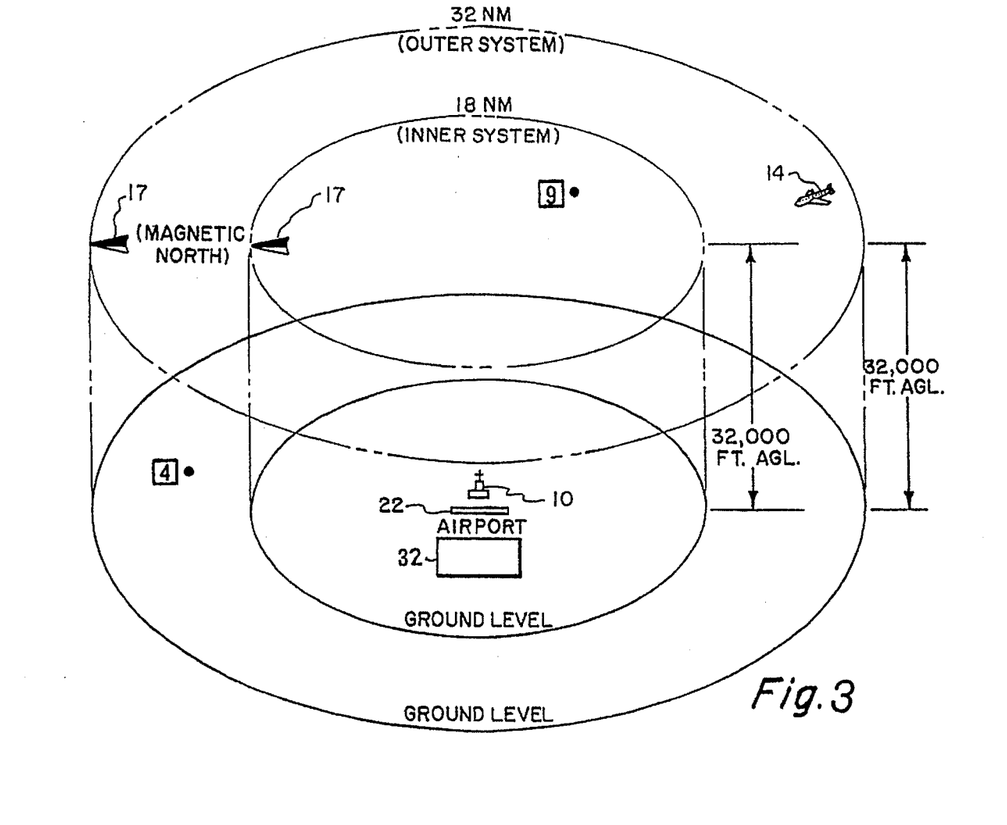
FIG. 3 is a graphic representation of the area surrounding an airport where the ground based system is located.

The best mode for carrying out the invention is presented in terms of a preferred embodiment, as shown in FIGS. 1–4, that is comprised of two major elements, a ground based system 32 and an aircraft based system 34. The ground based system 32 is located near the vicinity of an airport control tower 10 as shown in FIGS. 1 and 3. From the ground based system via a satellite 77 or directly via an antenna 12, typically shown as a part of the airport control tower 10, are transmitted aircraft hazardous incidents to an approaching aircraft 14 that incorporates the aircraft based system 34.

Within the approaching aircraft 14 there is located a cockpit and a cockpit instrument panel 16. Mounted within this cockpit instrument panel 16 is a display 18 which can consist of a black and white or color cathode ray tube (CRT) or a headup display (HUD). The display 18 images include an artificial horizon line 20, a visual representation of the runway 22 on which the aircraft 14 is to land or take off, a set of illuminated dots 24 which represent the VASI or PAPI lights which are used by the pilot to determine the correct glide slope into the runway 22, aircraft-hazardous incidents such as microbursts 26, thunderstorms, wake turbulences 27 and other dangerous winds, and flying aircraft 29 located at close proximity to the runway 22.

VASI stands for Visual Approach Slope Indicator and PAPI stands for Precision Approach Path Indicator. The VASI or PAPI light dots 24 function in the same manner as the VASI or PAPI lights that are mounted directly adjacent on the left side of the landing runway 22. The VASI or PAPI lights 24 will show either white over white indicating that the plane 14 is too high for landing, or red over red indicating that the plane 14 is too low for landing, or red over white that indicates that the plane is at the correct glide slope for landing.

The system for detecting and viewing aircraft-hazardous incidents that may be encountered by aircraft landing or taking off, is comprised of the ground based system 32 and the aircraft based system 34. These systems are operated within a flight area that is divided into an outer system and an inner system. The outer system becomes operational when the approaching aircraft 14 is at least thirty-two nautical miles from the runway 22. During the time the aircraft 14 is within the outer system, but before entering the inner system, the runway 22 is not displayed on the display 18. However, images of the dots 29 corresponding to flying aircraft are displayed as shown in FIGS. 2 and 3.

When the aircraft 14 is at least eighteen nautical miles from the runway, the inner system becomes operational. When within the inner system, the runway 22 with the runway indicia 19,21; the VASI or PAPI lights 24; and the artificial horizon line 20 are displayed on the display 18 in combination with proportionally sized meteorological phenomena. The meteorological phenomena includes the microburst 26 which includes a substantially vertical stem area 26A and a lower inverted mushroom area 26B as shown in FIG. 2.

Figure 4:
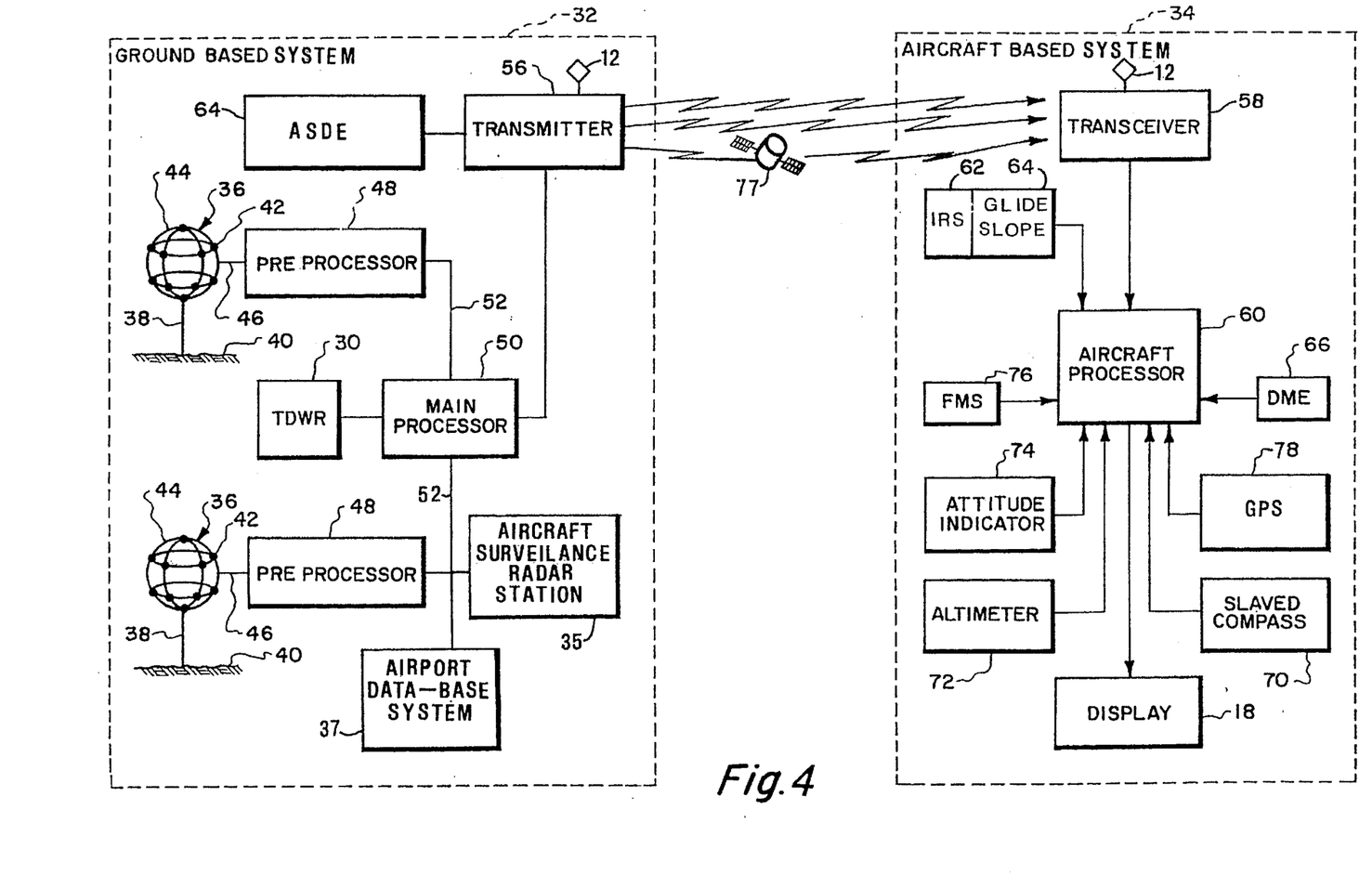
FIG. 4 is an overall block diagram showing the interface between the ground based system and the aircraft based system.

The ground based system 32 as shown in FIG. 4, is comprised of the following seven major elements: a plurality of ground detecting devices 36, a plurality of preprocessors 48, a terminal doppler weather radar (TDWR) 30, an airport surveillance radar station (ASRS) 35, an airport data-base system 37, a main processor 50 and a combination transmitter 56 and antenna 12.

The ground detection devices 36 as shown in FIG. 4, detect and provide signals corresponding to wind velocity, wind direction, wind azimuth and the wake turbulence produced by flying aircraft 29. Although in FIG. 4, there is only shown two detection devices 36, in reality, however, there would be a substantial number of such devices located in a zig-zag pattern along the length of the runway 22 and in alignment with each end of the runway 22. Out some selected spaced distance from each end of the runway, in what is determined to be the take-off and approach pattern from the runway 22, there is mounted a plurality of the detection devices 36 in a selected pattern. Normally, the devices 36 are spaced from seven hundred to one thousand feet apart. However, this spacing can vary as well as the number of the detection devices 36.

The preferred detection device 36 as shown in FIG. 4, consists of a globular frame forming an anemometer 44 which is mounted on a supporting stand 38 on the ground 40. Normally, the stand 38 will be no more than twenty-five feet off the ground 40. Mounted on the anemometer 44 of each detection device 36 are a plurality of electronic wind flow sensors 42. The wind flow sensors 42 constitute sensors with a desirable design being an air flow sensor, Model No. 8WM2000 series, defined as a microbridge mass airflow sensor, manufactured by Microswitch, a division of Honeywell of Freeport, Ill. However, any desirable air flow sensor can be utilized. Within each anemometer 44 of the detection device 36 there is mounted generally at least fifteen or twenty of the sensors 42.

The anemometer 44 is typically constructed of tubing or solid members and is termed a hot wire anemometer. This hot wire anemometer 44 with wind flow sensors 42, when subjected to wind, is used to determine the velocity, direction and azimuth of the wind. For a more detailed description of the preferred detection device 36, please refer to U.S. Pat. No. 5,262,773 which has been incorporated herein by reference.

As shown in FIG. 4, the output from each detection device 36 is transmitted by a fiber optic conductor 46 to a preprocessor 48 which comprises the second major element of the ground based system 32. The preprocessors 48 function to process the data received from its respective detection device 36. From each preprocessor 48, the data is transmitted by a conductor 52 to the main processor 50.

The third major element of the ground based system 32 is the terminal doppler weather radar (TDWR) 30 as shown in FIG. 4. The TDWR provides updated signals pertaining to:

a) The geographical location of the TDWR 30 by latitude and longitude.

b) The altitude of the TDWR above mean sea level (MSL) or below sea level, c) The meteorological phenomena that occurs within an area of at least 32 nautical miles and an altitude of at least 32,000 feet above ground level.

d) A magnetic north reference-point, the distance in nautical miles from the TDWR 30 to the meteorological phenomena, and e) The degrees referenced from magnetic north to the meteorological phenomena.

The airport surveillance radar station (ASRS) 35 as shown in FIG. 4 is the fourth major element of the ground based system 32. The ASRS provides updated signals pertaining to:

a) The geographical location of the ASRS by latitude and longitude, b) The altitude of the ASRS above mean sea level (MSL) of below sea level, c) Aircraft 29 flying within an area of at least 32 nautical miles and an altitude of at least 32,000 feet above ground level, d) A magnetic north reference-point, e) The distance in nautical miles from the ASRS 35 to the flying aircraft, f) The degrees from magnetic north to the flying aircraft, g) The altitude of the flying aircraft above mean sea level, h) An altitude scale ranging from 1000 feet to at least 32,000 feet above ground level.

The fifth major element of the ground based system is the airport data base system 37 as shown in FIG. 4. This system provides updated signals pertaining to:

a) The latitude and longitude of the airport landing runway entrance and exit as referenced from the centerline of the airport landing runway, b) The length and width of the landing runway 22, c) The altitude of the landing runway above mean level (MSL) of below sea level, d) A scaled reference line for measurement purposes, e) The length of the non-usable portion of the landing runway, f) Indicia pertaining to the landing runway, g) The geographical points corresponding to the latitude and longitude of the VASI or PAPI lights 24, and h) The glide slope angle of the VASI or PAPI lights toward the horizon.

The main processor 50 as shown in FIG. 4, comprises the sixth major element of the ground based system. The processor 50 receives and processes the signals from:

a) The ground detection devices 36 via the preprocessor 48, b) The TDWR 30, c) The ASRS 35, d) The airport data base system 37, and e) Transmits the processed signals from the main processor 50 to the aircraft based system 34 for further processing via the transmitter 56 and antenna 12 which comprise the seventh and final element of the ground based system 32.

The signals transmitted by the ground based system 32 are transmitted to the approaching aircraft 14 which incorporates the aircraft based system 34. The signals are transmitted directly to the aircraft 14 via the transmitting antenna 12 or indirectly via a satellite 77 as shown in FIG. 4.

The aircraft based system 32 is disclosed in two implementations. The first aircraft based system 32 is typically implemented on smaller aircraft and the second is implemented on large commercial and military aircraft such as the Boeing 747 series.

The first aircraft based system 34 as shown in FIG. 4 is comprised of eight major elements:

a) A combination transceiver 58 and antenna 12 that receives all the signals transmitted by the transmitter 56 located in the ground based system 32.

b) An aircraft processor 60 that is applied the signals received by the transceiver 58 as well as signals from:

(1) A distance measuring equipment (DME) 66 that supplies a signal corresponding to the distance of the landing aircraft 14 to the landing runway 22, (2) An attitude indicator 74 that supplies a signal corresponding to the artificial horizon line 20, (3) An altimeter 72 that supplies a signal corresponding to the altitude of the approaching aircraft 14 mean sea level (MSL), (4) A slaved compass 70 that supplies a signal corresponding to correct magnetic north, and (5) A global positioning system (GPS) 78 that in combination with a set of satellites 77 supplies signals corresponding to the geographical location by latitude and longitude of the approaching aircraft 14.

The second aircraft based system 34 as also shown in FIG. 4 is comprised of five major elements:

a) A combination transceiver 58 and antenna 12 that receives all the signals transmitted by the transmitter 56 located in the ground based system 32, b) An aircraft processor 60 that is applied the signals received by the transceiver 58 as well as signals from:

(1) a flight management system (FMS) 76 that incorporates a distance measuring equipment (DME) 66 and a global positioning system (GPS) 78, and (2) an inertial reference system (IRS) 62 that incorporates a glide slope 67 an altimeter 72, a slaved compass 70 and a GPS 78, and c) An attitude indicator 74 that supplies a signal corresponding to the artificial horizon line 20.

The GPS 78 is available from Litton Aero Products of Moorpark, Calif., Model No. LTN-2001. One manufacturer for the FMS 76 is Model No. UNS-1A of Universal Navigation Corporation of Tucson, Ariz. Litton Aero Products also makes the IRS 62. The glide slope 67, the DME 66, the ILS 68, the slaved compass 70, the altimeter 72 and the attitude indicator 74 are all instruments which are in common use in conjunction with aircraft.

The aircraft based system 34 has means for displaying on the display 18 the following images which are shown in FIG. 2:

a) The runway 22, which is divided into a landing portion and non-landing portion, is displayed with corresponding runway indicia 21 which includes runway number(s), letter(s) and precision instrument markers 19.

b) Two illuminated dots 24 representing the location of the VASI or PAPI lights, c) An artificial horizon line 20, d) The meteorological phenomena, e) At least one illuminated dot 29 representing the location of aircraft flying in the vicinity of the runway 22, f) A number located within a circle that is positioned to the right of the microburst 26. The number corresponds to the nautical miles of the microburst to the approaching aircraft 14, and g) A number located within a square that is positioned to the left of an illuminated dot 29 representing a flying aircraft. The number corresponds to the nautical miles of the flying aircraft to the approaching aircraft 14.

The runway 22 with the corresponding indicia 21 is developed and displayed as follows:

a) The airport data base system 37 provides to the aircraft processor 60:

(1) Signals corresponding to the latitude and longitude of the entrance and exit of the runway 22 as referenced to the centerline of the runway as shown in FIG. 2, (2) The length and width of the runway, and (3) A scaled reference line, b) The aircraft processor 60:
  (1) Generates two marker dots that correspond to the latitude and longitude centerline of the runway. Knowing the length and width of the runway a scaled rectangular runway 22, as shown in FIG. 2 is developed by the aircraft processor 60,
  (2) Places the indicia 21 pertaining to the runway 22 on the developed runway 22,
  (3) Adjusts the altitude of the runway with respect to the altitude of the approaching aircraft 14, and
  (4) In combination with the GPS 78 generates two illuminated dots 24, corresponding to the latitude and longitude of the VASI and PAPI lights, and places the dots adjacent to the left side of the runway as also shown in FIG. 2,
  (5) In combination with the altitude indicator 74 produces an artificial horizon line 20,
  (6) In combination with the GPS 78 establishes the geographical location of the approaching aircraft 14 with reference to the closest marker dot which corresponds to the entrance of the runway 22, and c) The aircraft processor 60 then provides a display signal that allows the image of the completed runway 22 together with the indicia 21, the VASI or PAPI lights 24 and the artificial horizon line 20 to be proportionally displayed on the display as shown in FIG. 2.

The meteorological phenomena is developed and displayed as follows:

a) The plurality of ground detector devices 36 provide the aircraft processor 60 with wind velocity, wind direction, wind azimuth and the wake turbulence 27 produced by other aircraft, b) The terminal doppler weather radar (TDWR) 30 provides the aircraft processor 60 with signals pertaining to:
  (1) The geographical location and the altitude of the TDWR 30 above mean sea level (MSL) or below sea level,
  (2) An altitude scale ranging from 1000 feet to at least 32,000 feet above ground level,
  (3) A magnetic north reference-point,
  (4) The distance in nautical miles from the TDWR 30 to the meteorological phenomena, and
  (5) The degrees as referenced from magnetic north to the meteorological phenomena to the approaching aircraft 14, c) The aircraft processor 60 processes and aligns the signals received which are referenced to the magnetic north reference-point with the magnetic north of the slaved compass 70, d) The altimeter 72 provides the aircraft processor 60 with an altitude signal that is adjusted to correspond with the runway altitude above or below mean sea level (MSL), and e) The aircraft processor 60:
  (1) In combination with the slaved compass 70 establishes the heading of the approaching aircraft 14,
  (2) In combination with the GPS 78 establishes the geographical location of the approaching aircraft 14,
  (3) In combination with the altimeter 72 establishes the altitude of the approaching aircraft 14,
  (4) Provides a horizontal and a vertical field of view, each consisting of at least a 50° arc as referenced from the aircraft heading,
  (5) Provides a display signal that allows the meteorological phenomena to be displayed on the display 18 in correct proportion to their size in relation to the size of the runway. For example, as shown in FIG. 2, a microburst 26 is displayed with an upper vertical stem area 26A and a lower inverted mushroom area 26B in referenced to the horizon. Thus, the pilot is able to view the microburst as if flying under visual flight rules.

The aircraft flying in the vicinity of the runway are developed and displayed as follows:

a) The airport surveillance radar station (ASRS) 35 provides the aircraft processor 60 with:
  (1) The geographical location by latitude and longitude, and the altitude above mean sea level (MS) or below sea level of the ASRS 35 to the flying aircraft 29,
  (2) The location and altitude MSL of aircraft 29 flying within an area of at least 32 nautical miles and an altitude of at least 32,000 feet above ground level as shown in FIG. 3,
  (3) A magnetic north reference-point,
  (4) The distance in nautical miles and the direction in degrees as referenced from magnetic north, of the flying aircraft 29 from the ASRS 35,
  (5) An altitude scale signal ranging from 1000 feet to at least 32,000 feet above ground level, b) The aircraft processor 60 process and aligns the signals received, which are referenced to the magnetic north 17 reference-point with the magnetic north of the slaved compass 70.

c) The altimeter provides the aircraft processor 60 with an altitude signal that is adjusted to correspond with the runway 22 altitude, d) The aircraft processor 60:
  (1) In combination with the slaved compass 70 establishes the heading of the approaching aircraft 14,
  (2) In combination with the GPS 78 establishes the geographical location of the approaching aircraft 14,
  (3) In combination with the altimeter 72 establishes the altitude MSL of the approaching aircraft 14,
  (4) Provides a horizontal field of view consisting of an arc of at least 50° and a vertical field of view also consisting of an arc of at least 50°, where the arcs are referenced from the approaching aircraft heading, and
  (5) Provides a display signal that further produces a set of illuminated dots 29 as shown in FIG. 2, that are displayed on the display 18 where each dot 29, represents a flying aircraft, e) The aircraft processor 60 has circuit means for detecting an illuminated dot 29 of a flying aircraft that is within:
  (1) A range of at least 500 feet above of at least 500 feet below the flight path of the approaching aircraft 14,
  (2) At least one-half nautical mile in front and rear of the approaching aircraft and
  (3) An angle of at least 10° from each side of the flight path. If a flying aircraft 29 is detected within the above parameters, an alarm signal is produced by the aircraft processor 60. The alarm signal energizes an alarm to warn the pilot of an eminent mid-air collision course so that the pilot can take immediate evasive action.

To aid the pilot in decision making, the system display 18 includes the number within a circle that is positioned on the right side of the microburst main body 26A which extends above the inverted mushroom 26B as shown in FIG. 2. The circled numbers represent the distance in nautical miles from the microburst 26 to the approaching aircraft 14. The circled numbers are developed and displayed by utilizing the circuit means of the ground based system 32 and the aircraft based system 34 as follows:

a) The terminal doppler weather radar (TDWR) 30 provides the aircraft processor 60 with:
 (1) The geographical location by latitude and longitude, and the altitude of the TDWR 30 above mean sea level (MSL) or below sea level,
 (2) A magnetic north reference-point,
 (3) The distance in nautical miles and direction in degrees as referenced from magnetic north, from the TDWR 30 to the microburst 26, and b) The aircraft processor 60:
 (1) In combination with the global positioning system (GPS) 78 and the altimeter 72, establishes the geographical location and altitude of the approaching aircraft 14,
 (2) Aligns the signals received which are referenced to the magnetic north 17 reference-point with the magnetic north of the slaved compass 70, and
 (3) In combination with the scaled reference line, provided by the airport data base system 37, determines the distance of the approaching aircraft 14 to the microburst 26.

As a further pilot aid, the display 18 includes the illuminated dot and to the left of the dot, the number within a square as shown in FIGS. 2 and 3. The dot represents a flying aircraft 29 and the number represents the nautical mile distance of an aircraft flying within at least a thirty-two nautical mile radius as scaled from the airport surveillance radar. The display and development of the squared numbers are provided by the circuit means included in the ground based system 32 and the aircraft based system 34 as follows:

a) The aircraft surveillance radar station 35 provides the aircraft processor 60 with:
 (1) The geographical location by latitude and longitude, and the altitude of said ASRS 35 above mean sea level (MSL) or below sea level,
 (2) A magnetic north reference-point,
 (3) The distance in nautical miles and direction in degrees referenced from magnetic north, from the ASRS 35 to the flying aircraft 29 represented by the illuminated dot,
 (4) The altitude in feet (MSL) of the flying aircraft 29, b) The aircraft processor:
 (1) In combination with said global positioning system (GPS) 78 and altimeter 72, establishes the geographical position and altitude of the approaching aircraft 14,
 (2) Aligns the signals received which are referenced to the magnetic north 17 reference-point with the magnetic north of the slaved compass 70, and
 (3) In combination with the scaled reference line, provided by the airport data base system 37, determines the distance of the approaching aircraft 14 to the flying aircraft 29.

While the invention has been described in complete detail and pictorially shown in the accompanying drawings, it is not to be limited to such details, since many changes and modifications may be made in the invention without departing from the spirit and scope thereof. For example, the invention could be used in conjunction with helicopter landing pads and aircraft carrier runways. The inventive system can also be designed to incorporate other commercial systems and equipment. One such equipment is an airport surface detection equipment (ASDE) 64 as shown in FIG. 4.

The ASDE displays aircraft runways and taxi ways, moving and stationary aircraft and ground vehicles, and airport structures. The ASDE is designed to provide data that allows an air traffic controller to prevent collisions between aircraft and/or between aircraft and ground vehicles. However, the ASDE data can also be transmitted to the aircraft based system 34 to allow the pilot to take evasive actions during inclement weather such as fog. Also, the image on the display 18 could be incorporated with other display instruments in the cockpit such as the Electronic Flight Instrumentation System (EFIS). Hence, it is described to cover any and all modifications and forms which may come within the language and scope of the appended claims.

I claim:

1. A system for detecting and viewing aircraft-hazardous incidents that occur at close proximity to an airport runway, where said aircraft hazardous incidents include microbursts which are vertically displayed in the correct position and in proportion to their size in relation to the size of the runway, thunderstorms, tornadoes, the wake turbulence of aircraft, and flying aircraft, said system comprising:

A. a ground based system having means for:
 a) a terminal doppler weather radar (TDWR) that provides signals pertaining to:
  (1) the geographical location of said TDWR by latitude and longitude,
  (2) the altitude of said TDWR above means sea level (MSL) or below sea level,
  (3) meteorological phenomena within the range of said TDWR,
  (4) a magnetic north reference-point,
  (5) the distance in nautical miles from said TDWR to the meteorological phenomena,
  (6) the degrees referenced from magnetic north to the meteorological phenomena, and
 b) an airport surveillance radar station (ASRS) that provides updated signals pertaining to:
  (1) the geographical location of said ASRS by latitude and longitude,
  (2) the altitude of said ASRS above means sea level (MSL) or below sea level,
  (3) aircraft flying within the range of said ASRS,
  (4) a magnetic north reference-point,
  (5) the distance in nautical miles from said ASRS to the flying aircraft,
  (6) the degrees from magnetic north to the flying aircraft,
  (7) the altitude of the flying aircraft above mean sea level,
 c) an airport-data base system that provides updated signals pertaining to:
  (1) the latitude and longitude of the airport landing runway entrance and exit as referenced from the centerline of the airport landing runway,
  (2) the length and width of the landing runway,
  (3) the altitude of the landing runway above mean sea level (MSL) or below sea level,
  (4) a scaled reference line for measurement purposes,
  (5) indicia pertaining to the landing runway,
  (6) two geographical points corresponding to the latitude and longitude of the VASI or PAPI lights, and
  (7) the glide slope angle toward the horizon of the VASI or PAPI lights,
 d) a main processor that receives and processes the signals from:

(1) said TDWR,
(2) said ASRS, and
(3) said airport data base system, and
(4) a transmitter that transmits the processed signals from said main processor to an aircraft based system fop further processing, and B. an aircraft based system having means for receiving the transmitted signals corresponding to said aircraft-hazardous incidents and processing the signals for further application to a display, that displays to the pilot of said aircraft said aircraft hazardous incidents.

2. A system for detecting and viewing aircraft-hazardous incidents that occur at close proximity to an airport runway, where said aircraft hazardous incidents include microbursts which are vertically displayed in the correct position and in proportion to their size in relation to the size of the runway, thunderstorms, tornadoes, the wake turbulence of aircraft, and flying aircraft, said system comprising:

A. a ground based system comprising:
  a) a plurality of ground detection devices dispersed near and around the vicinity of the airport runway where said ground detection devices detect and provide signals corresponding to wind velocity, wind direction, wind azimuth, and the wake turbulence produced by flying aircraft,
  b) a terminal doppler weather radar (TDWR) that provides updated signals pertaining to:
    (1) the geographical location of said TDWR by latitude and longitude,
    (2) the altitude of said TDWR above mean sea level (MSL) or below sea level,
    (3) the meteorological phenomena that occurs within an area of at least 32 nautical miles and an altitude of at least 32,000 feet above ground level,
    (4) a magnetic north reference-point,
    (5) the distance in nautical miles from said TDWR to the meteorological phenomena,
    (6) the degrees referenced from magnetic north to the meteorological phenomena, and
  c) an airport surveillance radar station (ASRS) that provides updated signals pertaining to:
    (1) the geographical location of said ASRS by latitude and longitude,
    (2) the altitude of said ASRS above mean sea level (MSL) or below sea level,
    (3) aircraft flying within an area of at least 32 nautical miles and an altitude of at least 32,000 feet above ground level,
    (4) a magnetic north reference-point,
    (5) the distance in nautical miles from said ASRS to the flying aircraft,
    (6) the degrees from magnetic north to the flying aircraft,
    (7) the altitude of the flying aircraft above mean sea level,
    (8) an altitude scale ranging from 1000 feet to at least 32,000 feet above ground level,
  d) an airport-data base system that provides updated signals pertaining to:
    (1) the latitude and longitude of the airport landing runway entrance and exit as referenced from the centerline of the airport landing runway,
    (2) the length and width of the landing runway,
    (3) the altitude of the landing runway above mean sea level (MSL) or below sea level,
    (4) a scaled reference line for measurement purposes,
    (5) the length of the non-usable portion of the landing runway,
    (6) indicia pertaining to the landing runway,
    (7) two geographical points corresponding to the latitude and longitude of the VASI or PAPI lights, and
    (8) the glide slope angle toward the horizon of the VASI or PAPI lights,
  e) a main processor that receives and processes the signals from:
    (1) said ground detection devices via a pre-processor,
    (2) said TDWR,
    (3) said ASRS, and
    (4) said airport data base system, and
    (5) a transmitter that transmits the processed signals from said main processor to an aircraft based system for further processing, and B) an aircraft based system having means for receiving the signals corresponding to said aircraft-hazardous incidents and processing the signals for further application to a display, that displays to the pilot of said aircraft said aircraft hazardous incidents.

3. A system for detecting and viewing aircraft-hazardous incidents that occurs at close proximity to an airport runway, where said aircraft hazardous incidents include microbursts which are vertically displayed in the correct position and in proportion to their size in relation to the size of the runway, thunderstorms, tornadoes, the wake turbulence of aircraft, and flying aircraft, said system comprising:

A. a ground based system comprising:
  a) a plurality of ground detection devices dispersed near and around the vicinity of the airport runway where said ground detection devices detect and provide signals corresponding to wind velocity, wind direction, wind azimuth, and the wake turbulence produced by flying aircraft,
  b) a terminal doppler weather radar (TDWR) that provides updated signals pertaining to:
    (1) the geographical location of said TDWR by latitude and longitude,
    (2) the altitude of said TDWR above mean sea level (MSL) or below sea level,
    (3) the meteorological phenomena that occurs within an area of at least 32 nautical miles and an altitude of at least 32,000 feet above ground level,
    (4) a magnetic north reference-point,
    (5) the distance in nautical miles from said TDWR to the meteorological phenomena,
    (6) the degrees referenced from magnetic north to the meterological phenomena, and
  c) an airport surveillance radar station (ASRS) that provides updated signals pertaining to:
    (1) the geographical location of said ASRS by latitude and longitude,
    (2) the altitude of said ASRS above mean sea level (MSL) or below sea level,
    (3) aircraft flying within an area of at least 32 nautical miles and an altitude of at least 32,000 feet above ground level,
    (4) a magnetic north reference-point,
    (5) the distance in nautical miles from said ASRS to the flying aircraft,
    (6) the degrees from magnetic north to the flying aircraft,
    (7) the altitude of the flying aircraft above mean sea level,
    (8) an altitude scale ranging from 1000 feet to at least 32,000 feet above ground level, d) an airport-data base system that provides updated signals pertaining to:
  (1) the latitude and longitude of the airport landing runway entrance and exit as referenced from the centerline of the airport landing runway,
  (2) the length and width of the landing runway,
  (3) the altitude of the landing runway above mean sea level (MSL) or below sea level,
  (4) a scaled reference line for measurement purposes,
  (5) the length of the non-usable portion of the landing runway,
  (6) indicia pertaining to the landing runway,
  (7) two geographical points corresponding to the latitude and longitude of the VASI or PAPI lights, and
  (8) the glide slope angle toward the horizon of the VASI or PAPI lights,
e) a main processor that receives and processes the signals from:
  (1) said ground detection devices via a pre-processor,
  (2) said TDWR,
  (3) said ASRS, and
  (4) said airport data base system, and
  (5) a transmitter that transmits the processed signals from said main processor to an aircraft based system for further processing, and
B) an aircraft based system having means for receiving the signals corresponding to said aircraft-hazardous incidents and processing the signals for further application to a display, that displays to the pilot of said aircraft said aircraft hazardous incidents, wherein said aircraft based system comprises:
  a) a transceiver that receives all signals transmitted by said transmitter located in said ground based system,
  b) an aircraft processor that receives the signals transmitted by said transceiver as well as signals from:
    (1) a distance measuring equipment (DME) that supplies a signal corresponding to the distance of the landing aircraft to the landing runway,
    (2) an attitude indicator that supplies a signal corresponding to the artificial horizon line,
    (3) an altimeter that supplies a signal corresponding to the altitude of the approaching aircraft mean sea level (MSL),
    (4) a slaved compass that supplies a signal corresponding to correct magnetic north, and
    (5) a global positioning system (GPS) that in combination with a set of satellites supplies signals corresponding to the geographical location by latitude and longitude of said approaching aircraft.

4. A system for detecting and viewing aircraft-hazardous incidents that occurs at close proximity to an airport runway, where said aircraft hazardous incidents include microbursts which are vertically displayed in the correct position and in proportion to their size in relation to the size of the runway, thunderstorms, tornadoes, the wake turbulence of aircraft, and flying aircraft, said system comprising:
A. a ground based system comprising:
  a) a plurality of ground detection devices dispersed near and around the vicinity of the airport runway where said ground detection devices detect and provide signals corresponding to wind velocity, wind direction, wind azimuth, and the wake turbulence produced by flying aircraft,
  b) a terminal doppler weather radar (TDWR) that provides updated signals pertaining to:
    (1) the geographical location of said TDWR by latitude and longitude,
    (2) the altitude of said TDWR above mean sea level (MSL) or below sea level,
    (3) the meteorological phenomena that occurs within an area of at least 32 nautical miles and an altitude of at least 32,000 feet above ground level,
    (4) a magnetic north reference-point,
    (5) the distance in nautical miles from said TDWR to the meteorological phenomena,
    (6) the degrees referenced from magnetic north to the meteorological phenomena, and
  c) an airport surveillance radar station (ASRS) that provides updated signals pertaining to:
    (1) the geographical location of said ASRS by latitude and longitude,
    (2) the altitude or said ASRS above mean sea level (MSL) or below sea level,
    (3) aircraft flying within an area of at least 32 nautical miles and an altitude of at least 32,000 feet above ground level,
    (4) a magnetic north reference-point,
    (5) the distance in nautical miles from said ASRS to the flying aircraft,
    (6) the degrees from magnetic north to the flying aircraft,
    (7) the altitude of the flying aircraft above mean sea level,
    (8) an altitude scale ranging from 1000 feet to at least 32,000 feet above ground level,
  d) an airport-data base system that provides updated signals pertaining to:
    (1) the latitude and longitude of the airport landing runway entrance and exit as referenced from the centerline of the airport landing runway,
    (2) the length and width of the landing runway,
    (3) the altitude of the landing runway above mean sea level (MSL) or below sea level, (
    (4) a scaled reference lime for measurement purposes,
    (5) the length of the non-usable portion of the landing runway,
    (6) indicia pertaining to the landing runway,
    (7) two geographical points corresponding to the latitude and longitude of the VASI or PAPI lights, and
    (8) the glide slope angle toward horizon of the VASI or PAPI lights,
  e) a main processor that receives processes the signals from:
    (1) said ground detection devices via a pre-processor,
    (2) said TDWR,
    (3) said ASRS, and
    (4) said airport data base system, and
    (5) a transmitter that transmits the processed signals from said main processor to an aircraft based system for further processing, and
B) an aircraft based system having means for receiving the signals corresponding to said aircraft-hazardous incidents and processing the signals for further application to a display, that displays to the pilot of said aircraft said aircraft hazardous incidents, wherein said aircraft based system comprises:
  a) a transceiver that receives all signals transmitted by said transmitter located in said ground based system,
  b) an aircraft processor that receives the signals transmitted by said transceiver as well as signals from:

(1) a flight management system (FMS) that incorporates a distance measuring equipment (DME) and a global positioning system (GPS), and (2) an inertial reference system (IRS) that incorporates a glide slope, an altimeter, a slaved compass and a GPS, and c) an attitude indicator that supplies a signal corresponding to the artificial horizon line.

5. The system as specified in claim 3 wherein said aircraft based system comprises a means for displaying on said display:

a) the runway with corresponding runway indicia, b) two illuminated dots representing the location of the VASI or PAPI lights, c) an artificial horizon line, d) the meteorological phenomena, and e) at least one illuminated dot representing the location of aircraft flying in the vicinity of the runway.

6. The system as specified in claim 5 wherein said aircraft based system further comprises a means for developing and displaying on said display:

a) a number located within a circle that is positioned to the right of a displayed microburst, where said number corresponds to the nautical miles of said microburst to said approaching aircraft, and b) a number located within a square that is positioned to the left of an illuminated dot representing a flying aircraft, that is flying within an area of at least 32 nautical miles and an altitude of at least 32,000 feet above ground level, where the dot is developed and positionally updated on said display by said airport surveillance radar, and, where said number corresponds to the nautical miles of said flying aircraft to said approaching aircraft.

7. The system as specified in claim 6 wherein said means for displaying on said display the runway with corresponding indicia comprises:

a) said airport data base system transmits to said aircraft processor signals pertaining to:

(1) the latitude and longitude of the entrance and exit of the runway as referenced to the centerline of the runway, (2) the length and width of the runway, and (3) a scaled reference line, b) said aircraft processor processes the signals received and:

(1) generates two marker dots that correspond to the latitude and longitude centerline of the runway, where knowing the length and width of the runway a scaled rectangular runway is developed by said aircraft processor, (2) places the indicia pertaining to the runway on the developed runway, (3) adjusts the altitude of the runway with respect to the altitude of the approaching aircraft, and (4) in combination with said GPS generates two illuminated dots, corresponding to the latitude and longitude of the VASI and PAPI lights, and places the dots adjacent to the left side of the displayed runway, (5) in combination with said attitude indicator produces an artificial horizon line, (6) in combination with said GPS establishes the geographical location of the approaching aircraft with reference to the closest marker dot which corresponds to the entrance of the runway, and c) where said aircraft processor then provides a display signal that allows the image of the completed runway together with the indicia, said VASI or PAPI lights, and the artificial horizon line to be proportionally displayed on said display.

8. The system as specified in claim 6 wherein said means for displaying on said display the meteorological phenomena comprises:

a) said plurality of ground detection devices provide said aircraft processor with signals pertaining to wind velocity, wind direction, wind azimuth and the wake turbulence produced by aircraft, b) said terminal doppler weather radar (TDWR) provides said aircraft processor with signals pertaining to:

(1) the geographical location and the altitude of said TDWR above mean sea level (MSL) or below sea level, (2) an altitude scale ranging from 1000 feet to at least 32,000 feet above ground level, (3) a magnetic north reference-point, (4) the distance in nautical miles from said TDWR to the meteorological phenomena, and (5) the degrees as referenced from magnetic north to said meteorological phenomena and to said approaching aircraft, c) said aircraft processor processes and aligns the signals received, which are referenced to the magnetic north reference-point, with the magnetic north of the slaved compass, d) said altimeter provides said aircraft processor with an altitude signal that is adjusted to correspond with the runway altitude above or below mean sea level (MSL), and e) said aircraft processor:

(1) in combination with said slaved compass establishes the heading of said approaching aircraft, (2) in combination with said GPS establishes the geographical location of said approaching aircraft, (3) in combination with said altimeter establishes the altitude of said approaching aircraft, (4) provides a horizontal and a vertical field of view, each consisting of at least a 50° arc as referenced from the aircraft heading, (5) provides a display signal that allows the meteorological phenomena to be displayed on said display in correct proportion to their size in relation to the size of said runway.

9. The system as specified in claim 6 wherein said means for displaying aircraft flying in the vicinity of the runway comprises:

a) said airport surveillance radar station (ASRS) transmits to said aircraft processor signals pertaining to:

(1) the geographical location by latitude and longitude, and the altitude above mean sea level (MSL) or below sea level of said ASRS to the flying aircraft, (2) the location and altitude MSL of aircraft flying within an area of at least 32 nautical miles and an altitude of at least 32,000 feet MSL above ground level, (3) a magnetic north reference-point, (4) the distance in nautical miles and the direction in degrees as referenced from magnetic north, of the flying aircraft from the ASRS, (5) an altitude scale signal ranging from 1000 feet to at least 32,000 feet above ground level, b) said aircraft processor processes and aligns the signals received, which are referenced to the magnetic north reference-point, with the magnetic north of the slaved compass, c) said altimeter provides said aircraft processor with an altitude signal that is adjusted to correspond with the runway altitude, d) said aircraft processor:
  (1) in combination with said slaved compass establishes the heading of the approaching aircraft,
  (2) in combination with said GPS establishes the geographical location of said approaching aircraft,
  (3) in combination with said altimeter establishes the altitude MSL of said approaching aircraft,
  (4) provides a horizontal field of view consisting of an arc of at least 50° and a vertical field of view also consisting of an arc of at least 50°, where the arcs are referenced from the approaching aircraft heading, and
  (5) provides a display signal that further produces a set of illuminated dots that are displayed on said display, where each dot represents a flying aircraft, e) said aircraft processor having circuit means for detecting an illuminated dot of a flying aircraft that is within:
  (1) a range of at least 500 feet above or at least 500 feet below the flight path of said approaching aircraft, and
  (2) at least one-half nautical mile in front and the rear of said approaching aircraft, and
  (3) an angle of at least 10° from each side of the flight path, where if a flying aircraft is detected within these parameters, an alarm signal is produced by said aircraft processor that energizes an alarm to warn the pilot of an eminent mid air collision course so that the pilot can take immediate evasive action.

10. The system as specified in claim 6 wherein said means for developing and displaying on said display a number located within a circle comprises:

a) said terminal doppler weather radar (TDWR) transmits to said aircraft processor with signals pertaining to:
  (1) the geographical location by latitude and longitude, and the altitude of said TDWR above mean sea level (MSL) or below sea level,
  (2) a magnetic north reference-point,
  (3) the distance in nautical miles and direction in degrees as referenced from magnetic north, from said TDWR to the microburst, and b) said aircraft processor:
  (1) in combination with said global positioning system (GPS) and said altimeter, establishes the geographical location and altitude of the approaching aircraft,
  (2) processes and aligns the signals received, which are referenced to the magnetic north reference-point, with the magnetic north of the slaved compass,
  (3) in combination with the scaled reference line, provided by said airport data base system, determines the distance of said approaching aircraft to the microburst, and
  (4) having circuit means for generating the number located within a circle that is positioned to the right of the microburst, where said number corresponds to the nautical miles of said microburst to said approaching aircraft.

11. The system as specified in claim 10 wherein said means for developing and displaying on said display a number located within a square comprises:

a) said airport surveillance radar station (ASRS) transmits to said aircraft processor with signals pertaining to:
  (1) the geographical location by latitude and longitude, and the altitude of said ASRS above mean sea level (MSL) or below sea level,
  (2) a magnetic north reference-point,
  (3) the distance in nautical miles and direction in degrees referenced from magnetic north, from said ASRS to the flying aircraft represented by the illuminated dot,
  (4) the altitude in feet (MSL) of said flying aircraft, b) said aircraft processor:
  (1) in combination with said global positioning system (GPS) and altimeter, establishes the geographical position and altitude of said approaching aircraft,
  (2) processes and aligns the signals received, which are referenced to the magnetic north reference-point, with the magnetic north of the slaved compass,
  (3) in combination with the scaled reference line, provided by said airport data base system, determines the distance of said approaching aircraft to the flying aircraft,
  (4) having circuit means for generating the number located within a square that is positioned to the left of the illuminated dot representing a flying aircraft, where said number corresponds to the nautical miles of the flying aircraft to said approaching aircraft.

12. The system as specified in claim 11 wherein said ground based system and said aircraft based system operates within a flight area that is divided into an outer system and an inner system, where said outer system becomes operational when said approaching aircraft is at least thirty-two nautical miles from said runway, where during the time said approaching aircraft is within the range of the outer system, images of said flying aircraft represented by illuminated dots are displayed, and where said inner system is activated when said approaching aircraft is at least eighteen nautical miles from said runway, where during the time that said approaching aircraft is within the range of said inner system, said runway, said VASI or PAPI lights, and said artificial horizon line are displayed on said display in combination with proportionally sized said meteorological phenomena data.

13. The system as specified in claim 5 wherein said display comprises a cathode ray tube (CRT) or a headup display (HUD).

14. A system for detecting and viewing aircraft-hazardous incidents that occur at close proximity to an airport runway, where said airport runway with corresponding indicia is viewed on a display located in the cockpit of an approaching aircraft and is developed by signals provided by said system which comprises:

a) a ground based system that further comprises an airport data-base system that produces and transmits signals pertaining to:
  (1) the latitude and longitude of the entrance and exit of the runway as referenced to the centerline of the runway,
  (2) the length and width of the runway,
  (3) the altitude of the landing runway above mean sea level (MSL) or below sea level,
  (4) a scaled reference line for measurement purposes,
  (5) the length of the non-usable portion of the landing runway,
  (6) indicia pertaining to the landing runway,
  (7) two geographical points corresponding to the latitude and longitude of the VASI or PAPI lights, and
  (8) the glide slope angle toward the horizon of the VASI or PAPI lights, and b) a main processor that receives and processes the signals from said airport data-base system, and c) a transmitter that transmits the processed signals from said main processor to an aircraft based system for further processing, d) an aircraft based system comprising an aircraft processor that receives and processes the signals transmitted by said ground based system and:
   (1) generates two market dots that correspond to the latitude and longitude centerline of the runway, where knowing the length and width of the runway a scaled rectangular runway is developed by said aircraft processor,
   (2) places the indicia pertaining to the runway on the developed runway,
   (3) adjusts the altitude of the runway with respect to the altitude of the approaching aircraft, and
   (4) in combination with a global positioning system (GPS) generates two illuminated dots, corresponding to the latitude and longitude of a pair of VASI or PAPI lights, and places the dogs adjacent to the left side of the displayed runway,
   (5) in combination with an attitude indicator on board said approaching aircraft produces an artificial horizon line,
   (6) in combination with said GPS establishes the geographic location of the approaching aircraft with reference to the closest marker dot which corresponds to the entrance of the runway, and
c) where said aircraft processor then provides a display signal that allows the image of the completed runway together with the indicia, said VASI or PAPI lights, and the artificial horizon line to be proportionally displayed on said display.

15. A system for detecting and viewing aircraft hazardous meteorological phenomena that occur at close proximity to an aircraft runway and which include microbursts, thunderstorms, tornadoes and the wake turbulence of other aircraft, where said meteorological phenomena is viewed on a display located in the cockpit of an approaching aircraft and is developed by signals provided by said system which comprises:
   a) a ground based system that comprises:
      (1) a plurality of ground detection devices which produce and transmit wind velocity, wind direction, wind azimuth and the wake turbulence produced by other aircraft,
      (2) a terminal doppler weather radar (TDWR) which provides signals pertaining to:
         (a) the geographical location and the altitude of said TDWR above mean sea level (MSL) or below sea level,
         (b) an altitude scale ranging from 1000 feet to at least 32,000 feet above ground level,
         (c) a magnetic north reference-point,
         (d) the distance in nautical miles from said TDWR to the meteorological phenomena, and
         (e) the degrees as referenced from magnetic north to said meteorological phenomena and to said approaching aircraft,
   b) an aircraft based system comprising:
      (1) an aircraft processor that receives and processes the signals transmitted by said ground based system and aligns the signals which are referenced to the magnetic north reference-point with the magnetic north of a slaved compass,
      (2) an altimeter which provides said aircraft processor with an altitude signal that is adjusted to correspond with the runway altitude above or below mean sea level (MSL), and
      (3) said aircraft processor further
         (a) in combination with a slaved compass established the heading of said approaching aircraft,
         (b) in combination with a global positioning system (GPS) establishes the geographic location of said approaching aircraft,
         (c) in combination with an altimeter establishes the altitude of said approaching aircraft,
         (d) provides a horizontal and a vertical field of view, each consisting of at least a 50° arc as referenced from the aircraft heading, and
         (e) provides a display signal that allows the meteorological phenomena to be displayed on said display in correct proportion to their size in relation to the size of said runway.

16. A system for detecting and viewing aircraft flying in the vicinity of an airport runway, where said flying aircraft are viewed on a display located in the cockpit of an approaching aircraft and are developed by signals provided by said system which comprises:
   a) a ground based system that comprises:
      (1) an airport surveillance radar station (ASRS) that transmits signals pertaining to:
         (a) the geographical location by latitude and longitude, and the altitude above mean sea level (MSL) or below sea level of said ASRS to the flying aircraft,
         (b) the location and altitude MSL of aircraft flying within an area of at least 32 nautical miles and an altitude of at least 32,000 feet above ground level,
         (c) a magnetic north reference-point,
         (d) the distance in nautical miles and the direction in degrees as referenced from magnetic north, of the flying aircraft from said ASRS,
         (e) an altitude scale signal ranging from 1000 feet to at least 32,000 feet above ground level,
   b) an aircraft based system comprising:
      (1) an aircraft processor that receives and processes the signals from said ground based system and aligns the signals which are referenced to the magnetic north reference-point, with the magnetic north of a slaved compass,
      (2) an altimeter which provides said aircraft processor with an altitude signal that is adjusted to correspond with the runway altitude, and where said aircraft processor:
         (a) in combination with a scaled compass establishes the heading of the approaching aircraft,
         (b) in combination with a global positioning system (GPS) establishes the geographical location of said approaching aircraft,
         (c) in combination with an altimeter establishes the altitude MSL of said approaching aircraft,
         (d) provides a horizontal field of view consisting of an arc of at least 50° and a vertical field of view also consisting of an arc of at least 50°, where the arcs are referenced from the approaching aircraft heading, and
         (e) provides a display signal that further produces a set of illuminated dots that are displayed on said display, where each dot represents a flying aircraft.

17. The system as specified in claim 4 wherein said ground based system further comprises an airport surface detection equipment (ASDE) that displays the location of airport runways and taxi ways, and moving of stationary aircraft and vehicles located on or neap said airport runways and taxi ways, where said display data is supplied to said main processor for transmission to said aircraft based system for further processing.

* * * * *

UNITED STATES PATENT AND TRADEMARK OFFICE
CERTIFICATE OF CORRECTION

PATENT NO. : 5,657,009
DATED : August 12, 1997
INVENTOR(S) : GORDON, Andrew A.

It is certified that error appears in the above—identified patent and that said Letters Patent is hereby corrected as shown below:

Column 13, line 6, delete "fop" and insert --for--.

Column 16, line 38, delete the parenthesis "(".

Column 16, line 38, delete "lime" and insert --line--.

Column 16, line 49, add --and-- between "receives" and "processes".

Column 17, line 58, delete "and" and insert --or--.

Column 21, line 15, delete "dogs" and insert --dots--.

Column 22, line 62, delete "neap" and insert --near--.

Signed and Sealed this

Sixth Day of March, 2001

*Attest:*

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO. : 5,657,009
DATED : August 12, 1997
INVENTOR(S) : Andrew A. Gordon

It is certified that error appears in the above-identified patent and that said Letters Patent is hereby corrected as shown below:

Column 21,
Line 39, between "transmit" and "wind", please add: -- signals pertaining to --.

Column 22,
Line 43, delete "a scaled" and insert therefore -- the slaved --.
Line 48, delete "an" and insert therefore -- said --.

Signed and Sealed this

Thirteenth Day of May, 2003

JAMES E. ROGAN
*Director of the United States Patent and Trademark Office*